July 17, 1956
A. M. PINKOS ET AL
2,755,040
AIR INTAKE SYSTEM FOR AN AIRCRAFT
Filed Oct. 10, 1951
3 Sheets-Sheet 1
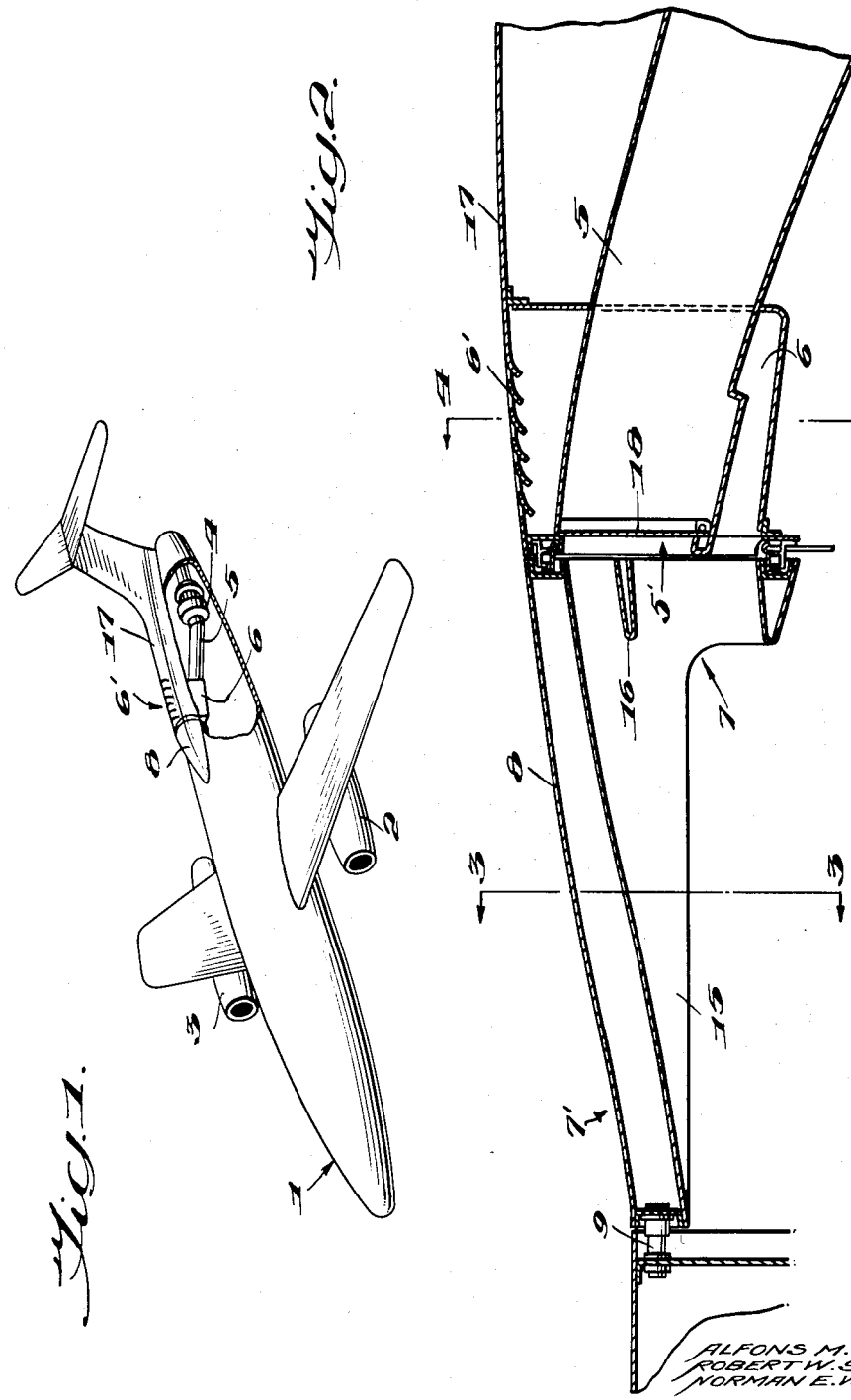
INVENTORS
ALFONS M. PINKOS,
ROBERT W. SCHROEDER,
NORMAN E. WILSON,
BY Martin E. Hogan Jr
ATTORNEY

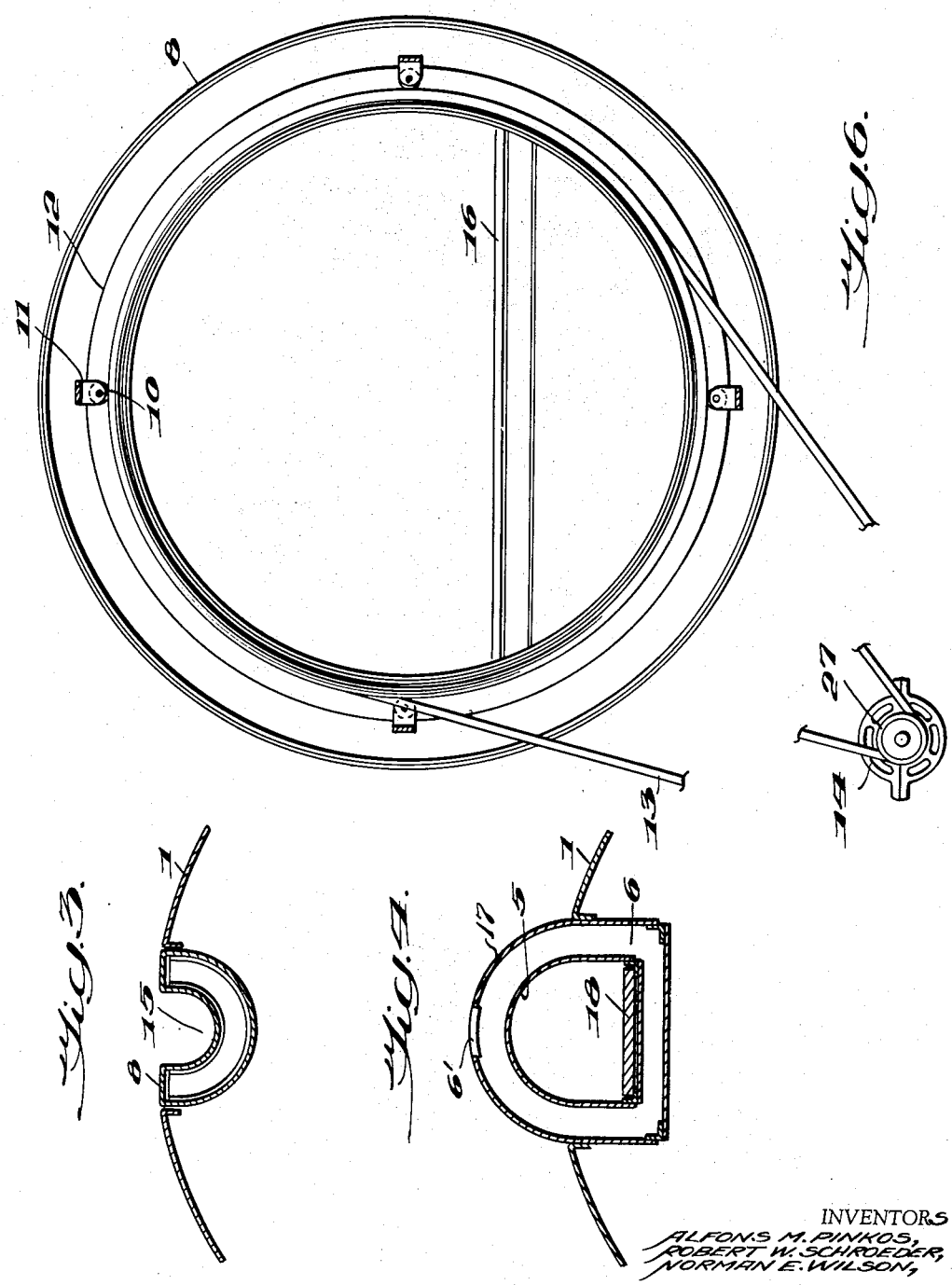

July 17, 1956 A. M. PINKOS ET AL 2,755,040
AIR INTAKE SYSTEM FOR AN AIRCRAFT
Filed Oct. 10, 1951 3 Sheets-Sheet 3
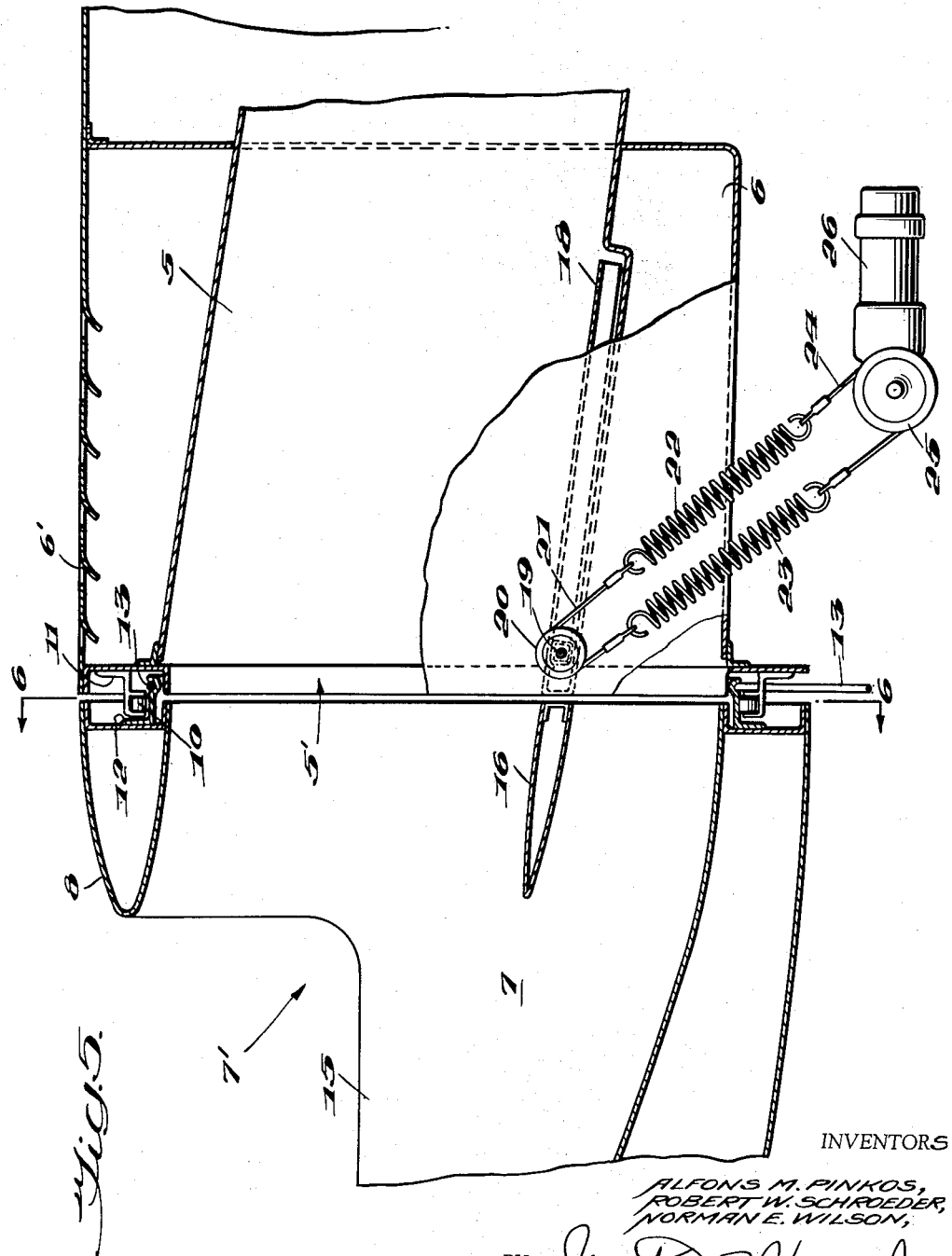
INVENTORS
ALFONS M. PINKOS,
ROBERT W. SCHROEDER,
NORMAN E. WILSON,
BY
ATTORNEY

United States Patent Office 2,755,040
Patented July 17, 1956

2,755,040
AIR INTAKE SYSTEM FOR AN AIRCRAFT

Alfons M. Pinkos, Chicago, Ill., Norman E. Wilson, Kingsville, Md., and Robert W. Schroeder, Oak Ridge, Tenn., assignors to The Glenn L. Martin Company, Middle River, Md., a corporation of Maryland Application October 10, 1951, Serial No. 250,756

7 Claims. (Cl. 244—53)

This invention relates to an air intake system for an engine mounted within a vehicle and especially to an air intake system for use in conjunction with an auxiliary turbo-jet engine housed within a high speed aircraft.

In the operation of such an aircraft, the auxiliary engine is normally inactive and is employed only when, for tactical reasons, extra power is needed. During such inactive periods it is desirable to close the intake end of the duct leading to that engine in order to prevent "windmilling" of the engine by the air flowing through the duct, since rotation of the engine while the lubricating system is inoperative would cause serious damage to the engine bearings.

In such high speed aircraft, there is considerable turbulence in the air immediately adjacent the surface of the aircraft and it is therefore desirable to provide means for separating the turbulent boundary layer air from the air entering the duct and to discharge such turbulent air back to the atmosphere through suitable discharge openings adjacent the intake end of the duct. However, when the auxiliary engine is inactive and the main air intake door is closed, there will be produced under high speed flight conditions a pressure differential between that existing adacent the tail pipe of the engine and that adjacent the boundary layer discharge openings which will tend to cause a flow of air in a reverse direction through the engine and out through the boundary layer discharge openings. Such reverse flow will tend to cause the engine to "windmill" in reverse and is also highly objectionable.

It is an object of this invention to provide an efficient air intake system for such an engine free from the above mentioned objections.

It is a further object of this invention to provide a door or closure for an air intake duct which will form an entrance to the duct when open, and which will form a smoothly contoured part of the surface of the vehicle when closed.

Another object of this invention is to provide novel means for separating the turbulent boundary air layer from the air entering the duct and to discharge such turbulent air to the atmosphere.

A further object of this invention is to provide a door to prevent reverse air flow through the engine and out through the boundary air bleed discharge openings when the engine is not operating and the air intake door is closed.

These and other objects of this invention will become apparent from the following description taken in connection with the accompanying drawings showing one embodiment of the invention.

Figure 1 is a perspective view of an airplane with one side cut away to show the general arrangement of the air intake system.

Figure 2 is a longitudinal section taken along the axis of rotation of the air intake door showing both the air intake and the reverse flow doors in closed position.

Figure 3 is a section taken on line 3—3 of Figure 2, but showing the door in its opened position.

Figure 4 is a section taken on line 4—4 of Figure 2.

Figure 5 is an enlarged view of a portion of Figure 2 showing the air intake door and the reverse flow door open, and showing the reverse flow door operating mechanism.

Figure 6 is a section taken on line 6—6 of Figure 5 and showing the operating means for the air intake door.

In Figure 1 is shown an aircraft 1, carrying jet engines 2, 3, and 4. An air duct 5 is provided for conducting air to the rear engin 4 and has its intake end 5' communicating with an air intake chamber 7 formed by the interior of the aircraft adjacent an air intake opening 7', the duct 5 extending through air bleed chamber 6 which, in turn, communicates with the atmosphere through louvers 6'.

In Figures 2 and 5 is shown the air intake door 8, pivoted at its forward end on pivot 9 and supported at its aft end by rollers 10 carried in brackets 11, which, in turn, are mounted on the structure of the aircraft 1. The ring 12, which is attached to the door 8, and which provides a bearing surface for the rollers 10, is grooved around its periphery to receive a cable 13 which also passes around pulley 27, the pulley being fixed to the shaft of actuator 14, as shown in Figure 6, and serving to rotate door 8 about an axis parallel to the longitudinal axis of the aircraft.

The inner surface of door 8 is shaped to form a tapering concave air channel 15, as shown in Figures 2 and 3, which is divided by a vane 16 extending laterally across the rear end of door 8 and movable therewith so that when said door is open, the upper portion of the airstream is directed into duct 5 and the lower portion is directed into chamber 6 from whence it is discharged into the atmosphere through louvers 6'. While vane 16, in the form of the invention illustrated in the drawings, is shown as mounted on and movable with the door 8, it will be understood that this is considered the most practical structure with parts having the relationship shown, and that if the vane were so arranged as to constitute a fixed extension of the lower wall of duct 5, the results would be the same.

Door 8, when closed, forms a contoured surface between the main fuselage surface of the aircraft 1, and the fairing or auxiliary fuselage surface 17 which covers the duct 5 and the chamber 6, as shown in Figures 1 and 2.

Figure 5 shows the reverse flow door 18 fixed at its forward edge to shaft 19, and arranged to swing about the axis of the shaft to open or close duct 5. To one end of shaft 19 is fixed pulley 20, around which passes cable 21, the ends of which are connected to springs 22 and 23, which are in turn connected with the ends of cable 24. The cable 24 passes around pulley 25 which is rotated by actuator 26 to open or close door 18.

Actuator 26 and air intake door actuator 14 may be controlled in any desired manner, although it is preferred that the control system be so arranged that the actuators rotate to open position simultaneously and to closed position in sequence, actuator 26 following intake door actuator 14.

With the system above described installed on an aircraft as shown in Figure 1, the operation is as follows.

With the aircraft in flight and using only engines 2 and 3, door 8 remains closed forming a contoured portion of the outer surface of the aircraft as above described. Reverse flow door 18 also remains closed preventing air from entering the engine thrust tube and rotating the engine in reverse.

When it is desired to operate engine 4, intake door actuator 14 and reverse flow door actuator 26 are energized so that door 8 begins to rotate into open position, and pulley 25 is rotated by actuator 26, increasing the tension in spring 22 and decreasing that in spring 23. Door 18 does not open, however, until the force exerted on it by the reverse air flow is exceeded by the net clockwise force exerted by the springs plus the force exerted by the ram air flowing through the partly open intake door, thus allowing door 18 to be opened by the development of much less torque by actuator 26 than would otherwise be required. Should actuator 26 fail to operate for any reason, the resilience of springs 22 and 23 will allow door 18 to be opened by the force of the ram air entering through door 8.

With doors 8 and 18 fully open, air is directed by the channel 15 formed by the inner surface of the door 8 toward the rear end of said door, where vane 16 divides the airstream, the turbulent boundary air layer adjacent to the lower surface of channel 15 being directed into chamber 6, from whence it passes back to the atmosphere through louvers 6', the remainder of the airstream being directed into duct 5 leading to the engine 4.

After engine 4 has ceased operating and it is desired to close doors 8 and 18, actuators 14 and 26 are energized in sequence, so that door 8 begins to close, and subsequently actuator 26 rotates pulley 25, increasing the tension in spring 23 and decreasing the tension in spring 22 until the net force exerted by the springs plus the force exerted by the reverse air flow on the door 18 exceeds the force exerted by the ram air, thus causing door 18 to close, and preventing further reverse air flow through the engine as hereinbefore described.

While this invention has been shown and described as applied to one type of vehicle, it should be understood that the invention is not confined to the precise details of construction herein set forth, as it is apparent that many changes and variations may be made without departing from the scope of the invention, and no limitation is intended by the phraseology of the foregoing description or illustrations in the accompanying drawings.

We claim as our invention:

1. In an air intake system for a jet engine, an air intake chamber having an air intake opening, an air intake duct extending from said air intake chamber to said engine, a boundary layer air bleed duct adjacent to said air intake duct and extending from said intake chamber to the atmosphere, an air intake door arranged to open and close said air intake opening and a reverse flow door mounted within said intake duct for closing said intake duct to prevent reverse flow therethrough when said air intake door is in a closed position.

2. In an aircraft having a fuselage, a jet engine enclosed within said fuselage, an air intake duct extending forwardly and upwardly from said jet engine, the forward end opening of said air intake duct being partly at least below the general contour of the upper surface of said aircraft, an air intake door rotatably mounted on said fuselage at the forward end of said intake duct operable to open or close said intake duct, said intake door forming a part of the normal contoured upper surface of said fuselage when closed, and forming an air channel when open, said channel sloping downwardly and rearwardly from the general contour of the upper surface of said aircraft toward said intake duct, means forming a chamber below the forward portion of said air intake duct, the lower side of said forward portion of said air intake duct forming the upper side of said chamber, the forward side of said chamber having an opening communicating with said air channel when said intake door is open, means forming a passageway to conduct air from said chamber to the exterior of said fuselage, a reverse flow door mounted within said air intake duct adapted to close when said intake door is closed thus preventing the passage of air from said intake duct, through said chamber, and out through said passageway.

3. In an aircraft having a fuselage, a jet engine enclosed within said fuselage, an air intake duct extending from said jet engine forwardly and upwardly to the exterior of said fuselage, boundary layer air bleed means including the lower wall portion of said air intake duct dividing the air flow into upper and lower portions, means defining a chamber to which said lower portion of said air is conducted, and boundary layer air exit means in said chamber opening to the exterior of said fuselage, a reverse flow door mounted within said air intake duct so as to fully obstruct the reverse air flow when said reverse flow door is closed and an air inlet door having an abridged conical shape rotatably mounted at the forward end of said air intake duct so as to fully obstruct the flow of air into said air intake duct when said air inlet door is closed.

4. In an aircraft having a fuselage, a jet engine enclosed within said fuselage, an air intake duct extending forwardly and upwardly from said jet engine, the forward end opening of said air intake duct being at least partly below the general contour of the upper surface of said aircraft, means forming a chamber adjacently below and extending rearwardly from the forward end of said air intake duct, said chamber being open at its forward side, means forming a passage from said chamber to conduct air from said chamber to the exterior of the fuselage, a generally conical shaped door rotatably mounted immediately forward of said air intake duct and said chamber, said door forming part of the normal contour of said upper surface of said fuselage when said door is closed, the forward part of said door forming an opening in said fuselage and the rear part of said door forming a passageway leading rearwardly from said opening when said door is open, the upper portion of said passageway being in substantial alignment with the forward end of said air intake duct, and the lower portion of said passageway being in substantial alignment with the forward side of said chamber.

5. In an aircraft having an engine housed therein and an air intake opening extending through the outer surface of said aircraft, an air duct for supplying air from said opening to said engine, boundary layer removal means associated with the intake end of said duct for separating the turbulent boundary layer air from that adjacent said intake end and having communication with the exterior of said aircraft independently of said opening, a first door adapted to close said opening when said engine is idle and a second door adapted to block communication between said duct and said boundary layer removal means to prevent reverse flow through said duct when said first door is closed.

6. In an aircraft having a fuselage and an air intake opening extending through the wall thereof, a door adapted to selectively open and close said opening, an air duct and a boundary layer removal chamber adapted to communicate with one another and with the exterior of said aircraft through said opening, said boundary layer chamber having a discharge opening communicating with the exterior of said aircraft independently of said first opening, and a reverse flow door adapted to block communication between said duct and said chamber when said first door is closed.

7. In an aircraft having an engine housed therein, an air duct adapted to conduct air from the exterior of said aircraft to said engine when the latter is in operation, boundary layer removal means adjacent the intake end of said duct and normally in fluid communication therewith for separating the turbulent boundary layer air from that adjacent the intake end of said duct, for discharging said boundary layer air to the exterior of said aircraft and for directing the adjacent streamlined air flow into said duct, and closure means for blocking the flow of air into said duct and for blocking communications between said duct and said boundary layer discharge means whereby reverse flow through said duct will be prevented when said engine is idle.

References Cited in the file of this patent

UNITED STATES PATENTS

| 2,076,232 | Goodman et al. | Apr. 6, 1937 |
| 2,214,722 | De Seversky | Sept. 10, 1940 |
| 2,362,552 | Heymann | Nov. 14, 1944 |
| 2,365,223 | Silverstein et al. | Dec. 19, 1944 |
| 2,589,945 | Leduc | Mar. 18, 1952 |